United States Patent [19]

Bierschenk et al.

[11] Patent Number: 5,198,139

[45] Date of Patent: * Mar. 30, 1993

[54] USE OF CHLOROFLUOROPOLYMERS AS LUBRICANTS FOR REFRIGERANTS

[75] Inventors: Thomas R. Bierschenk; Timothy J. Juhlke, both of Roundrock; Richard J. Lagow; Hajimi Kawa, both of Austin, all of Tex.

[73] Assignee: Exfluor Research Corporation, Austin, Tex.

[*] Notice: The portion of the term of this patent subsequent to Jun. 5, 2007 has been disclaimed.

[21] Appl. No.: 719,673

[22] Filed: Jun. 24, 1991

Related U.S. Application Data

[63] Continuation of Ser. No. 528,027, May 23, 1990, abandoned, which is a continuation-in-part of Ser. No. 355,771, May 23, 1989, Pat. No. 4,931,199.

[51] Int. Cl.$^5$ ............... C09K 5/04; C10M 105/54; C10M 107/38
[52] U.S. Cl. ..................... 252/68; 252/54; 252/58; 252/67; 62/114
[58] Field of Search ............ 252/68, 67, 54, 58; 62/114

[56] References Cited

U.S. PATENT DOCUMENTS

| 4,097,388 | 6/1978 | Snyder et al. | 252/49.9 |
| 4,199,461 | 4/1980 | Olund | 252/49.8 |
| 4,724,092 | 2/1988 | Fukui et al. | 252/54 |
| 4,931,199 | 6/1990 | Bierschenk et al. | 252/68 |

FOREIGN PATENT DOCUMENTS

| 60-013880 | 1/1985 | Japan . |
| 60-096684 | 5/1985 | Japan . |
| 61-113692 | 5/1986 | Japan . |
| 61-268642 | 11/1986 | Japan . |
| 268642 | 11/1986 | Japan . |
| 62-146976 | 6/1987 | Japan . |
| 01225685 | 9/1989 | Japan . |
| 02102296 | 4/1990 | Japan . |
| WO87/02992 | 5/1987 | World Int. Prop. O. . |

OTHER PUBLICATIONS

International Search Report that corresponds to the subject application.
WO87/02993, Lagow et al. (Publication date May 21, 1987).
Japan 253140 Abstract, Toa Nenryo Kogyo KK (Apr. 13, 1990).
Japan 051613 Abstract, Hitachi KK (Sep. 8, 1989).
Japan 203695 Abstract, Asahi Glass KK (May 30, 1985).
Japan 121526 Abstract, Asahi Glass KK (Jan. 24, 1985).
EP 0194465 Caporiccio et al (Publication date Sep. 17, 1986).
FR2367818, Snyder et al, May 12, 1978.
WO90/03409 Bierschenk et al. (publication date Apr. 5, 1990).
WO90/03353 Bierschenk et al. (Publication date Apr. 5, 1990).
WO90/03410 Bierschenk et al. (Publication date Apr. 5, 1990).

Primary Examiner—Christine Skane
Attorney, Agent, or Firm—Hamilton, Brook, Smith & Reynolds

[57] ABSTRACT

This invention pertains to the use of chlorofluoropolymers, such as perfluoropolyepichlorohydrin as lubricants for cooling systems which employ hydrofluorocarbon refrigerants, such as 1,1,1,2-tetrafluoroethane.

27 Claims, 1 Drawing Sheet

USE OF CHLOROFLUOROPOLYMERS AS LUBRICANTS FOR REFRIGERANTS

RELATED APPLICATIONS

This application is a file wrapper continuation of U.S. patent application Ser. No. 07/528,027, filed May 23, 1990, now abandoned, which is a continuation-in-part of U.S. patent application Ser. No. 07/355,771, filed May 23, 1989 now U.S. Pat. No. 4,931,199, issued to Bierschenk et al., the teachings of which are incorporated by reference herein.

BACKGROUND OF THE INVENTION

Chlorofluorocarbons are compounds widely used as refrigerants' cleaning fluids, propellants and blowing agents for foam manufacture. Despite the versatility of chlorofluorocarbons (CFCs), they have been directly linked to the depletion of the earth's ozone layer. As a result, these compounds are being replaced by hydrofluorocarbon (HFC) compounds and hydrochlorofluorocarbon (HCFC) compounds which do not adversely affect the environment.

Several potential replacements for CFC compounds are 1,1,1,2-tetrafluoroethane also known as HFC-134a, and chlorodifluoromethane ($CHClF_2$). also known as HCFC-22 Both HFC-134a and HCFC-22 have important uses in refrigeration and cooling systems. As such, HFC-134a has been developed as a replacement r for dichlorodifluoromethane, commonly known as Freon TM 12.

HFC-134a in particular, may be a good refrigerant replacement since its physical properties (boiling point, molecular weight and nonflammability) are similar to Freon TM 12. A major disadvantage of using HFC-134a as a refrigerant is that it is not miscible with existing mineral oils and other commonly used lubricants. This poses serious problems in providing a compressor component of a cooling or heating system with proper lubrication.

One reported refrigeration lubricant is a composition of tetrafluoroethane and polyoxyalkylene glycol (see U S. Pat. No. 4,755,316, Magid et al., Jul. 5, 1988). Another lubricant composition for refrigeration compressors comprises a mixture of polyether polyols and esters made from polyhydric alcohols or alkanedioic acids (see U.S. Pat. No. 4,851,144, McGraw and Ward, Jul. 25, 1989).

SUMMARY OF THE INVENTION

This invention pertains to the use of chlorofluoropolyethers to impart lubricity to hydrofluorocarbon (HFC) refrigerants used in cooling and heating systems such as air conditioners, refrigerators and heat pumps. This invention also pertains to compositions comprising an HFC refrigerant and a miscible chlorofluoropolyether lubricant in an amount sufficient to impart lubricity to the refrigerant. The HFC can be tetrafluoroethane, dichlorodifluoromethane, difluoromethane, or mixtures thereof. A preferred chlorofluoropolyether is perfluoropolyepichlorohydrin.

BRIEF DESCRIPTION OF THE FIGURE

The FIGURE shows the miscibility of several chlorofluoropolyethers in tetrafluoroethane as a function of temperature.

DETAILED DESCRIPTION OF THE INVENTION

Figure 1:
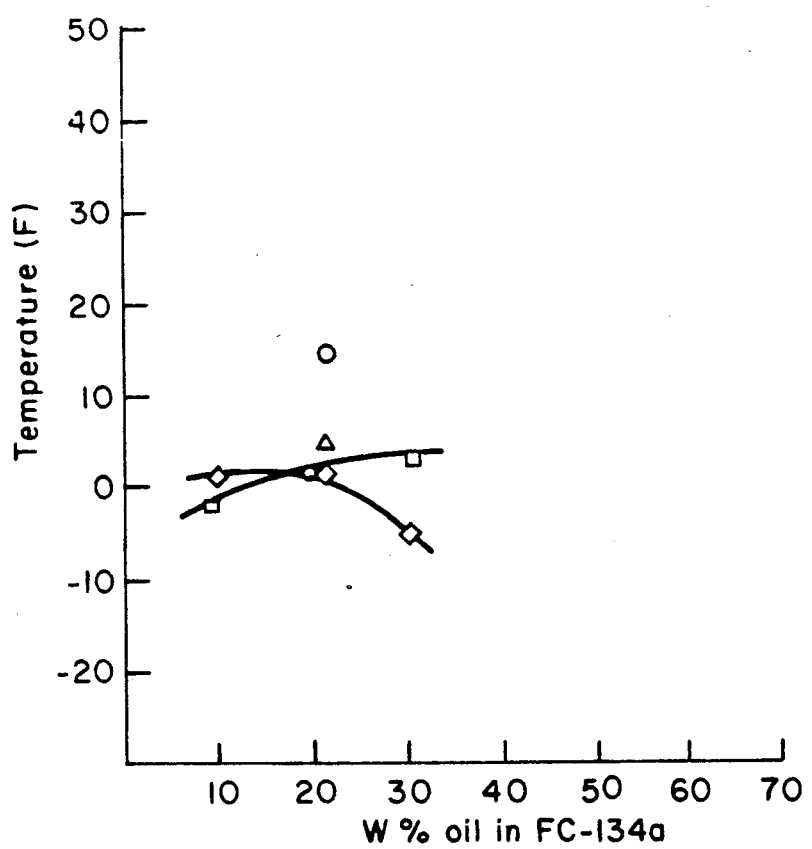

This invention pertains to a composition comprising a hydrofluorocarbon refrigerant and an amount of chlorofluoropolyether that is miscible therewith to impart desired lubricity to the refrigerant. The term "refrigerant" as used herein is a compound which can vaporize at low temperature and absorb heat as it is vaporized. A refrigerant, however, can also be used to give off heat by condensing it, as is its function in heat pumps, for example.

The preferred refrigerant is 1,1,1,2,-tetrafluoroethane(HFC-134a); however, its symmetrical isomer, 1,1,2,2-tetrafluoroethane, can also be used. The term "tetrafluoroethane" used herein is intended to encompass all isomeric forms of the compound. Additionally, the tetrafluoroethane refrigerant can be mixed with other refrigerants such as dichlorodifluoromethane and chlorodifluoromethane, and mixtures of these. In another embodiment, the refrigerant can be chlorodifluoromethane, 1,1,-difluoroethane ($CH_3CF_2H$; commonly known as HCFC-152a), 1-chloro-1,1,1-tetrafluoroethane ($CF_3CFClH$; commonly known as HCFC-124) or mixture thereof.

In the preferred embodiment, the composition comprises tetrafluoroethane and a chlorofluoropolyether lubricant miscible herewith. The amount of chlorofluoropolyether is that sufficient to impart desired lubricity to the HFC without adversely or significantly decreasing its cooling or heating capability. The ratio of chlorofluoropolyether lubricant to refrigerant in a heating or cooling system can vary, for example, between 1:20 and 20:1. The preferred weight ratio is between 1:5 and 5:1 The chlorofluoropolyether used in this invention should be chemically stable and non-reactive with the refrigerant or the cooling or heating system component it is in contact with.

In other embodiments, the composition of this invention comprises a mixture of one or more refrigerants, selected from the group consisting of hydrofluorocarbon, tetrafluoroethane, chlorofluorocarbon, dichlorodifluoromethane, and one or more different chlorofluoropolyether lubricants. Preferably, the refrigerant is a mixture of tetrafluoroethane and dichlorodifluoromethane.

Chlorofluoropolyethers of this invention which function as lubricants, contain from about 5 to about 50 wt. % chlorine. Preferably, the chlorofluoropolyethers will contain from about 15 to about 40 wt. % chlorine. The chlorofluoropolyethers which can be used in the compositions of this invention are miscible in the refrigerant of choice and impart lubricity thereto, unlike the commercially available perfluoropolyethers. The chlorofluoropolyether can be mixed with the refrigerant either separately or in combination with other chlorofluoropolyethers to form the compositions of the invention. A suitable chlorofluoropolyether lubricant has a boiling point of greater than 200° C., a viscosity of from about 0 to about 200 centistokes at 40° C. and a viscosity index of at least 20. The chlorofluoropolyether is a liquid at about 10° C. and miscible in the refrigerant at from about −18° C. to about 100° C. (see FIG. 1). The chlorofluoropolyether lubricants having a viscosity within the above range typically have a molecular weight from about 500 to about 5,000 atomic mass units (a.m.u.) Preferably, the molecular weight will be from about 1,000 to about 3,000 a.m.u.

The chlorofluoropolyether lubricants can be added to the refrigerant to form a miscible composition. The composition can then be introduced into the cooling or heating system to provide the system with both a refrigerant and lubricant which can circulate throughout the system as a miscible mixture. To ensure proper lubrication of the system, it is necessary for the composition to remain miscible throughout the entire range of refrigeration temperatures, which may range from about $-7°$ C. to about 100° C.

In another embodiment, the compositions of the invention can further comprise additives which enhance the performance of the composition. Such additives can be selected from (1) extreme pressure and antiwear additives, (2) oxidation and thermal stability improvers (3) corrosion inhibitors, (4) viscosity index improvers (5) pour and floc point depressants, (6) detergents, (7) antifoaming agents and (8) viscosity adjusters.

Alternatively, the chlorofluoropolyether lubricant can be added directly to a cooling or heating system containing one or more refrigerants therein. The chlorofluoropolyether mixes with the refrigerant as each is circulated through the system.

The compositions of the invention can be used in refrigerators, air conditioning systems and heat pumps to provide adequate lubrication to the compressor. Compositions of this invention can also be used to lubricate any system in which it is necessary to circulate a lubricant which is miscible in a hydrofluorocarbon, chlorofluorocarbon or chlorofluorohydrocarbon.

The chlorofluoropolyethers can be made by directly fluorinating polymers made by the polymerization of acetals, ketals, polyacetals, polyketals, and orthoesters with elemental fluorine as described in U.S. patent application Ser. No. 07/250,384, filed Sep. 28, 1988, now abandoned, and U.S. Pat. No. 5,052,536, both entitled "Fluorination of Acetals, Ketals and Orthoesters", the teachings of which are incorporated by reference herein. Such fluorination results in a fluorinated product that has essentially none or very few residual hydrogen atoms or functional (or reactive) groups or moieties. Further, any residual hydrogen atoms or functional groups can be subsequently replaced with fluorine by subjecting the chlorofluoropolyether to high temperature fluorination, however such removal is optional.

There are several classes of chlorofluoropolyethers which are useful as lubricants in the compositions of this invention. One such class is oligomeric or polymeric chlorofluoropolyethers having the average formula:

$$\text{X}-[\text{O}-\underset{\underset{R_2}{|}}{\overset{\overset{R_1}{|}}{\text{C}}}-\text{O}-\text{Y}]_n-[\text{O}-\underset{\underset{R_4}{|}}{\overset{\overset{R_3}{|}}{\text{C}}}-\text{O}-\text{Y}']_m-\text{OZ} \quad \text{I}$$

wherein Y and Y' are the same or different and are selected from the group consisting of linear and branched perfluoroalkylenes, preferrably having 2 to 6 carbon atoms; perfluoroalkyleneoxyalkylene and perfluoropoly(alkyleneoxyalkylene) each preferably having alkylene groups containing from 2 to 30 carbons and most preferably having 4 to 8 carbons; wherein in Y or Y' one or more of the fluorine atoms may be substituted by a halogen atom other than fluorine. Y and Y' can be isotactic perfluoropolyethers or atactic perfluoropolyethers, such as $-CF_2CF_2CF_2$, $-CF_2CF_2CF_2CF_2-$, $-CF_2CF_2OCF_2CF_2-$, $-CF_2(CF_3)CFOCF(CF_3)CF_2-$, $-CF_2CF(CF_2Cl)O-$ and $-CF_2CF_2OCF_2CF_2OCF_2CF_2-$. The perfluoropolyethers comprising Y and Y' are random or non-random and may be isotactic, atactic or block copolymers. X and Z represent terminal groups which are the same or different and are selected from the group consisting of $(CF_2)_rOCF_3$ and $-CrF_{2r+1-q}Cl_q$, wherein r is an integer from 1 to 12 and q is an integer from 0 to 25. The groups $R_1$, $R_2$, $R_3$ and $R_4$ may be the same or different and are selected from the group consisting of $-F$, $-Cl$, $-CF_2Cl$, $-CFCl_2$, $-CCl_3$, perfluoroalkyl of one to ten carbon atoms (such as $-CF_3$, $-C_2F_5$, $-C_3F_7$ and $-C_4F_9$) and perfluoroalkoxyalkyl of one to ten carbon atoms (such as $-OCF_3$ and $-OC_2F_5$), wherein one or more of the fluorine atoms in said perfluoroalkyl and perfluoroalkoxyalkyl may be substituted by a halogen atom other than fluorine, e.g. chlorine. The subscript n is an integer from 1 to 50 and the subscript m is an integer from 0 to 50. The chlorofluoropolyethers of formula I must have at least two chlorine atom.

The n and m subscripts of Formula I are average indices of composition such that when m is zero the polyether is referred to as an alternating copolymer of:

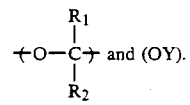

When m and n are greater than zero, the polyether is a terpolymer containing

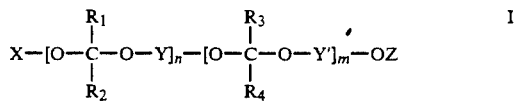

groups having random OY and OY' units along the polymer chain.

The following examples show some chlorofluoropolyethers of Formula I where m is zero, p is an integer between 1 and 50 and either X or Z or both have at least two chlorine atoms:

$$\text{X}-[\text{O}-\text{CF}_2-(\text{O}-\text{CF}_2-\text{CF}_2)_p]_n-\text{OZ}$$

$$\text{X}-[\text{O}-\text{CF}_2-(\text{O}-\text{CF}_2-\text{CF}_2-\text{CF}_2)_p]_n-\text{OZ}$$

$$\text{X}-[\text{O}-\underset{\underset{\text{CF}_3}{|}}{\text{CF}}-(\text{O}-\text{CF}_2-\text{CF}_2)_p]_n-\text{OZ}$$

$$\text{X}-[\text{O}-\underset{\underset{\text{CF}_3}{|}}{\overset{\overset{\text{CF}_3}{|}}{\text{C}}}-(\text{O}-\text{CF}_2-\text{CF}_2)_p]_n-\text{OZ}.$$

Other examples of the polyethers of Formula I where m is zero, p is defined above, Y is an isotactic perfluoropolyether or atactic fluoropolyether and either X or Z or both have at least two chlorine atoms, are shown below.

$$\text{X}-[\text{O}-\text{CF}_2-(\text{O}-\text{CF}_2-\underset{\underset{\text{CF}_3}{|}}{\text{CF}})_p]_n-\text{OZ}$$

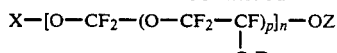

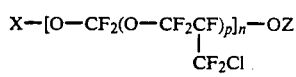

Another class of chlorofluoropolyether useful as lubricants in this invention are those miscible in the hydrofluorocarbon refrigerant, which have the average formula:

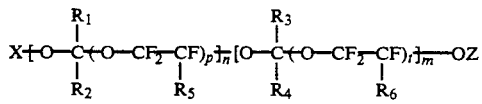

wherein $R_1$, $R_2$, $R_3$, $R_4$, $R_5$ and $R_6$ are the same or different and are selected from the group consisting of —F, —Cl, —CF$_2$Cl, —CFCl$_2$, —CCl$_3$, perfluoroalkyl of one to ten carbon atoms and perfluoroalkoxyalkyl of one to ten carbon atoms wherein fluorine may be substituted by one or more halogen atoms other than fluorine, such as chlorine; wherein X and Z are the same or different and are selected from the group consisting of —(CF$_2$)$_r$OCF$_3$, and —C$_r$F$_{2r+1-q}$Cl$_q$ wherein r is an integer from 1 to twelve and q is an integer from 0 to 25; wherein n is an integer from 1 to 50, m is an integer from 0 to 50; and p and t are the same or different and are integers from 1 to 50. Preferably, p and t are integers from 1 to 10. The chlorofluoropolyether of Formula II must have at least two chlorine atoms.

Examples of random copolymers of Formula II in which m and n are greater than zero, p and t are defined above and which have at least two chlorine atoms, include:

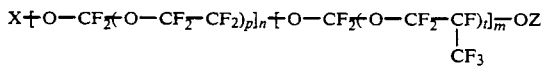

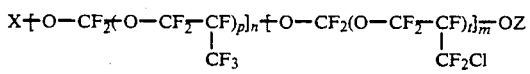

Still another class of chlorofluoropolyether lubricants of this invention have the average formula:

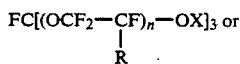  III

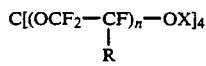  IV wherein X is selected from the group consisting of —(CF$_2$)$_r$OCF$_3$ and —C$_r$F$_{2r+1-q}$Cl$_q$ where r is an integer from 1 to 12 and q is an integer from 0 to 25. Preferably, X is —CF$_3$, —C$_2$F$_5$, —C$_3$F$_7$ or CF$_2$OCF$_3$. The subscript n is an integer from 1 to 50 and R is selected from the group consisting of —F, —CF$_2$Cl, —CFCl$_2$, —CCl$_3$ and perfluoroalkyl of one to ten carbons. The chlorofluoropolyethers of Formulae III and IV must have one or more chlorine atoms such that the molecule has at least two substituent chlorine atoms.

Another class of chlorofluoropolyether lubricants of this invention have the average formula:

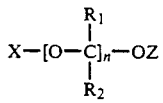  V wherein X and Z are selected from the group consisting of —(CF$_2$)$_r$OCF$_3$ and —C$_r$F$_{2r+1-q}$Cl$_q$, wherein r is an integer from 1 and 12 and q is an integer from zero and 25; wherein $R_1$ and $R_2$ are the same or different and are selected from the group consisting of —F, —Cl, —CF$_2$Cl, —CFCl$_2$, —CCl$_3$, perfluoroalkyl of 1 to 10 carbon atoms and perfluoroalkoxyalkyl of 1 to 10 carbon atoms; wherein the fluorine of the foregoing groups may be substituted with one or more halogen groups other than fluorine, such as chlorine; wherein n is an integer from 1 to 50; and wherein the chlorofluoropolyether has at least two chlorine atoms.

Yet another class of chlorofluoropolyether lubricants of this invention have the formula:

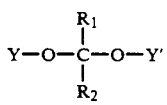  VI wherein Y and Y' are the same or different and are selected from the group consisting of perfluoroalkyl, perfluoroalkoxyalkyl, and perfluoroalkyleneoxyalkyl; wherein $R_1$ and $R_2$ are the same or different and are selected from the group consisting of —F, —Cl —CF$_2$Cl, —CFCl$_2$, —CCl$_3$, perfluoroalkyl having 1 to 20 carbon atoms and perfluoroalkyleneoxyalkyl; and wherein fluorine may be substituted with one or more halogen atoms other than fluorine, such as chlorine. Chlorofluoropolyethers of Formula VI have at least two chlorine atoms. The perfluoroalkylpolyether may be atactic, isotactic or a block copolymer having 1 to 50 carbon atoms.

Chlorofluoropolyethers of Formula VI which are formals will have $R_1$ and $R_2$ groups that are fluorine. Preferably, the polyether will comprise 12 to 20 carbon atoms. When $R_1$ is fluorine and $R_2$ is a group other than F, then the compound is an acetal of the formula Y—O—CF(R)—O—Y'. Preferably, the polyether will comprise from 12 to 50 carbon atoms and more preferably, will comprise 12 to 25 carbon atoms.

Another class of chlorofluoropolyethers that are suitable lubricants in this invention can be made by fluorinating addition polymers made by ring-opening polymerization of cyclic ethers epoxides, as described in U.S. patent application Ser. Nos. 07/251,135, filed Sep. 28, 1988, now abandoned, and 07/414,134, filed Sep. 28, 1989, now U.S. Pat. No. 5,093,422, both entitled "Fluorination of Epoxides", the teachings of which are incorporated herein by reference. Chlorofluoropolyether lubricants of this class are oligomers or polymers which have the general formula:

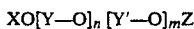  VII where Y and Y' are the same or different and are selected from the group consisting of

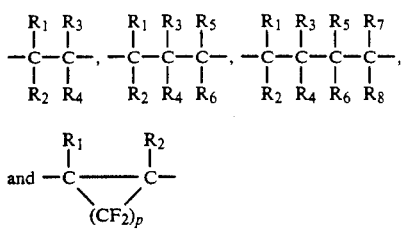

wherein $R_1$, $R_2$, $R_3$, $R_4$, $R_5$, $R_6$, $R_7$ and $R_8$, either separately or together, are F, Cl, a perfluoroalkyl of one to 20 carbons, preferably 1 to 10 carbon atoms, or a perfluoroalkoxyalkyl ether of two to 20 carbons, preferably 2 to 10 carbon atoms. In $R_1$ through $R_8$, one or more fluorine atoms may be substituted by a halogen atom other than fluorine (preferably chlorine). $R_2$ and $R_8$ when taken together can be $-CR_9R_{10}CR_{11}R_{12}-$ wherein $R_9$ through $R_{12}$ may be any of the groups given for $R_1$ through $R_8$. X and Z are the same or different and represent the terminal groups of the oligomer or polymer and may be a perfluoroalkyl of 1 to 10 carbon atoms (such as $-CF_3$, $-C_2F_5$, $-C_3F_7$, $-C_4F_9$), perfluoroalkyleneoxyalkyl (such as $-(CF_2)_rOCF_3$ wherein r is an integer from 1 to 12) and perfluoropoly(alkyleneoxyalkyl); wherein in X an Y one or more fluorine atoms may be substituted by a halogen atom other than fluorine. The subscript m is an integer from 0 to 50; subscript n is an integer from 1 to 50 and subscript p is an integer from 1 to 50 with a preferred range of 3 to 5. The chlorofluoropolyethers of Formula VII have at least two chlorine atoms.

The n and m subscripts in Formula VII are average indices of composition such that when m is zero the polyether is referred to as an isotactic or atactic homopolymer being composed of the repeating unit (YO); when m and n are both greater than zero the polyether is referred to as either a random copolymer, alternating copolymer or block copolymer of (YO) and (Y'O) repeating units.

A preferred chlorofluoropolyether of formula VII is perfluoropolyepichlorohydrin having the general formula:

wherein X, Z and n are previously defined. The term "perfluoro" as used herein is intended to mean a compound having all or essentially all hydrogen atoms replaced with fluorine atoms. Preferred perfluoropolyepichlorohydrin lubricants of this invention will have a molecular weight of from 500 to about 5000 atomic mass units.

The following examples will further illustrate the invention, but are not to be construed as limiting its scope.

EXAMPLE 1

A polyepichlorohydrin telomer having an average molecular weight of 1500 a.m.u. was fluorinated using the procedures outlined in U S. patent application Ser. Nos. 07/251,135, filed Sep. 28, 1988, now abandoned, and 07/414,119, filed Sep. 28, 1989 now U.S. Pat. No. 5,093,432, both entitled "Fluorination of Epoxides". The resulting fluorinated fluid had an average molecular weight of about 1500 a.m.u. The fluid had a kinematic viscosity of 43.0 at 40° C. and 5.7 cst. at 100° C. giving a Viscosity Index of 56.5 (ASTM 2270).

EXAMPLE 2

A portion of the sample described in Example 1 was distilled to remove the more volatile components. Upon removal of 20% of the sample, the remaining fluid had a viscosity of 107.9 at 40° C. and 9.9 cst at 100° C., giving a Viscosity Index of 58 6.

EXAMPLE 3

A polyepichlorohydrin telomer having an average molecular weight of 750 a.m.u., which was a volatile fraction of the product of Example 2, was fluorinated to give a fluorinated product which also had an average molecular weight of about 750 a.m u. The fluid had a kinematic viscosity of 2.9 at 40° C. and 1.0 cst. at 100° C.

EXAMPLE 4

A polyepichlorohydrin telomer having an average molecular weight of 1800 a.m.u. was fluorinated to give a fluorinated product which also had an average molecular weight of about 1800 a.m.u. The lubricant had a viscosity of 52.9 cst. at 40° C. and 19.53 cst. at 100° C., giving a Viscosity Index of 141.4.

EXAMPLE 5

A portion of the sample described in Example 4 was distilled to remove the more volatile components. Upon removal of 20% of the sample the remaining fluid had a viscosity of 135.4 at 40° C. and 81.22 cst at 100° C. giving a Viscosity Index of 143.8.

EXAMPLE 6

The miscibility of the lubricants (described in Examples 1-5) in 1,1,1,2-tetrafluoroethane (HFC-134a) using varying lubricant to refrigerant ratios. Known amounts of refrigerant and lubricant were placed in glass tubes which were then sealed. The tube was placed in a constant temperature bath and observed for at least 24 hours to determine if a phase separation occurred. Each of the fluid lubricants tested was completely miscible with HFC-134a from at least 100° C. down to the point shown in the FIGURE (the current specification of mobile air conditioning lubricants) when present over a wide range of concentrations.

The FIGURE shows the results of miscibility of polyepichlorohydrin telomers described above, in HFC-134a as a function of temperature. Note that miscibility of the chlorofluoropolyethers occurs above the curve. The solubility of the various telomers described in Examples 1, 2, 4 and 5 are indicated by the symbols, ◇, □, △ and ○, respectively, for a range of temperatures.

EXAMPLE 7

The lubricity of two lubricants was determined using a Falex Four-Ball wear test. Lubricants 1 and 2 correspond to perfluoropolyepichlorohydrin compounds described in Examples 1 and 2, respectively. The specimen ball, AISI E52100 steel having a hardness of 64 to 66, was rotated at 1760±40 RPM at 25° C. for 10 seconds. The results obtained are shown in Tables 1 and 2.

The results show that the lubricity of the perfluoroepichlorohydrin lubricants tested exceeded that of two perfluoropolyethers. Fomblin TM Z25 and Fomblin TM Y25. Lubricity data for Fomblin TM Y25 and Fomblin ™ Z25 based on ASTM D2266-67 for welding load was reported to be 400 and 500 kg, respectively (Caporiccio, G. in *Fluorine—the First Hundred Years*, Banks, R. E., et al. (Eds.) pp 314–320 (1986)). As shown in Tables 1 and 2, the welding loads for each of the two perfluoropolyepichlorohydrin lubricants, under almost identical conditions, exceeded 800 kg.

TABLE 1

LUBRICANT NO. 1

| Applied Load, $kg^A$ (L) | Average Scar Diameter, mm (X) | Compensation Scar Diameter, mm | $LD_h$ Factor | Corrected Load $kg^A$ ($LD_h/X$) |
|---|---|---|---|---|
| 80 | 0.52 | 0.42 | 30.08 | 57.85 |
| 100 | 0.62 | 0.46 | 40.5 | 65.32 |
| 126 | 0.68 | 0.50 | 55.2 | 81.18 |
| 160 | 0.73 | 0.54 | 75.8 | 103.84 |
| 200 | 0.83 | 0.59 | 102.2 | 123.13 |
| 250 | 0.90 | — | 137.5 | 152.78 |
| 315 | 1.00 | — | 187.1 | 187.1 |
| 400 | 1.18 | — | 258 | 218.64 |
| 500 | 1.39 | — | 347 | 249.64 |
| 620 | 1.52 | — | 462 | 303.95 |
| 800 | 1.66 | — | 649 | 390.96 |

Load Wear Index: ≧ 187.65
Weld Point, kgf: >800

TABLE 2

LUBRICANT NO. 2

| Applied Load, $kg^A$ (L) | Average Scar Diameter, mm (X) | Compensation Scar Diameter, mm | $LD_h$ Factor | Corrected Load $kg^A$ ($LD_h/X$) |
|---|---|---|---|---|
| 80 | 0.61 | 0.42 | 30.08 | 49.31 |
| 100 | 0.63 | 0.46 | 40.5 | 64.29 |
| 126 | 0.71 | 0.50 | 55.2 | 77.75 |
| 160 | 0.83 | 0.54 | 75.8 | 91.33 |
| 200 | 0.86 | 0.59 | 102.2 | 118.84 |
| 250 | 0.91 | — | 137.5 | 149.46 |
| 315 | 1.03 | — | 187.1 | 181.65 |
| 400 | 1.27 | — | 258 | 203.15 |
| 500 | 1.40 | — | 347 | 247.86 |
| 620 | 1.49 | — | 462 | 310.07 |
| 800 | 1.72 | — | 649 | 377.33 |

Load Wear Index: ≧ 182.17
Weld Point, kgf: >800

EQUIVALENTS

Those skilled in the art will recognize or be able to ascertain using no more than routine experimentation many equivalents to the specific embodiments of the invention described herein. Such equivalents are intended to be encompassed by the following claims:

We claim:

1. A refrigerant composition, comprising a fluorocarbon refrigerant selected from the group consisting of hydrofluorocarbon, chlorofluorocarbon, chlorofluorohydrocarbon and mixtures thereof and an amount of a perchlorofluoropolyether lubricant miscible therewith, sufficient to impart lubricity thereto, and wherein the perchlorofluoropolyether contains about 5 to about 50 weight percent chlorine and has a molecular weight of from about 500 to about 5000 a.m.u.

2. The composition of claim 1 wherein the refrigerant is selected from the group consisting of tetrafluoroethane, dichlorodifluoromethane, 1,1-difluoroethane, 1-chloro-1,1,1-tetrafluoroethane and mixtures thereof.

3. The composition of claim 2 wherein the fluorocarbon refrigerant is tetrafluoroethane.

4. The composition of claim 3 wherein the tetrafluoroethane is 1,1,1,2-tetrafluoroethane.

5. The composition of claim 3 further comprising dichlorodifluoromethane refrigerant.

6. The composition of claim 1 wherein the perchlorofluoropolyether lubricant comprises a mixture of one or more different perchlorofluoropolyether lubricants.

7. The composition of claim 1 wherein the perchlorofluoropolyether lubricant has a viscosity of about zero to about 200 centistokes at 40° C. and a viscosity index of at least 20 and is miscible in the refrigerant at a temperature of about −18° C. to about 100° C.

8. The composition of claim 1 having a weight ratio of fluorocarbon refrigerant to perchlorofluoropolyether lubricant from about 1:20 to about 20:1.

9. The composition of claim 8 wherein the weight ratio of fluorocarbon refrigerant to perchlorofluoropolyether lubricant is from about 1:5 to about 5:1.

10. The composition of claim 1 further comprising an additive to enhance the performance of the composition selected from the group consisting of (1) extreme pressure and antiwear additives, (2) oxidation and thermal stability improvers, (3) corrosion inhibitors, (4) viscosity index improvers, (5) pour and floc point depressants, (6) detergents, (7) antifoaming agents and (8) viscosity adjusters.

11. A refrigerant composition, comprising:
   a) a fluorocarbon refrigerant selected from the group consisting of a hydrofluorocarbon, chlorofluorocarbon, chlorofluorohydrocarbon and mixtures thereof; and
   b) an amount of a perchlorofluoropolyether lubricant sufficient to impart desired lubricity thereto, wherein the perchlorofluoropolyether lubricant contains about 5 to about 50 weight percent chlorine, has a molecular weight of from about 500 to about 5000 a.m.u., a viscosity of about zero to about 200 centistokes at 40° C. and a viscosity index of at least 20 and is miscible in the refrigerant at a temperature of about −18° C. to about 100° C.

12. The composition of claim 11 wherein the refrigerant is selected from the group consisting of tetrafluoroethane, dichlorodifluoromethane, 1,1-difluoroethane, 1-chloro-1,1,1-tetrafluoroethane and mixtures thereof.

13. The composition of claim 12 wherein the fluorocarbon refrigerant is tetrafluoroethane.

14. The composition of claim 13 wherein the tetrafluoroethane is 1,1,1,2-tetrafluoroethane.

15. The composition of claim 13 further comprising dichlorodifluoromethane refrigerant.

16. The composition of claim 11 wherein the perchlorofluoropolyether lubricant comprises a mixture of one or more different perchlorofluoropolyether lubricants.

17. The composition of claim 11 having a weight ratio of fluorocarbon refrigerant to perchlorofluoropolyether lubricant from about 1:20 to about 20:1.

18. The composition of claim 17 wherein the weight ratio of fluorocarbon refrigerant to perchlorofluoropolyether lubricant is from about 1:5 to about 5:1.

19. The composition of claim 18 wherein the perchlorofluoropolyether lubricant is perfluoropolyepichlorohydrin.

20. The composition of claim 11 further comprising an additive to enhance the performance of the composition selected from the group consisting of (1) extreme pressure and antiwear additives, (2) oxidation and thermal stability improvers, (3) corrosion inhibitors, (4) viscosity index improvers, (5) pour and floc point depressants, (6) detergents, (7) antifoaming agents and (8) viscosity adjusters.

21. The composition of claim 1 wherein the chlorofluoropolyether has an average formula:

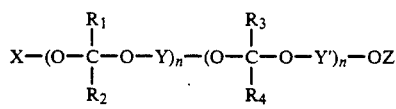

wherein Y and Y' are the same or different and are selected from the group consisting of linear and branched perfluoroalkylenes, perfluoroalkyleneoxyalkylene and perfluoropoly(alkyleneoxyalkylene) wherein in Y or Y' one or more of the fluorine atoms may be substituted by a halogen atom other than fluorine; wherein X and Z are the same or different and are selected from the group consisting of $-(CF_2)_rOCF_3$ and $-C_rF_{2r+1-q}Cl_q$, wherein r is an integer from 1 to 12 and q is an integer from 0 to 25; wherein $R_1$, $R_2$, $R_3$, and $R_4$ are the same or different and are selected from the group consisting of $-F$, $-Cl$, $-CF_2Cl$, $-CFCl_2$, $-CCl_3$, perfluoroalkyl of one to ten carbon atoms and perfluoroalkoxyalkyl of one to ten carbon atoms wherein one or more of the fluorine atoms may be substituted by a halogen atom other than fluorine; wherein n is an integer from 1 to 50; and wherein m is an integer from 0 to 50; and wherein the chlorofluoropolyether has at least two chlorine atoms.

22. A method of cooling or heating by circulating a refrigerant in a cooling or heating system, the improvement comprising using as the refrigerant, the composition of claim 1.

23. A method of cooling or heating by circulating a refrigerant in a cooling or heating system, the improvement comprising using as the refrigerant, the composition of claim 11.

24. The composition of claim 1 wherein the chlorofluoropolyether has an average formula:

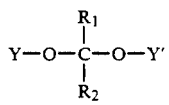

wherein Y and Y' are the same or different and are selected from the group consisting of perfluoroalkyl, perfluoroalkoxyalkyl and perfluoroalkyleneoxyalkyl; wherein $R_1$ and $R_2$ are the same or different and are selected from the group consisting of $-F$, $-Cl$, $-CF_2Cl$, $-CFCl_2$, $-CCl_3$, perfluoroalkyl of one to ten carbon atoms and perfluoroalkyleneoxyalkyl; wherein fluorine may be substituted with one or more halogen atoms other than fluorine; and wherein the chlorofluoropolyether has at least two chlorine atoms.

25. The composition of claim 1 wherein the chlorofluoropolyether has an average formula:

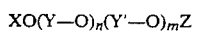

wherein Y and Y' are the same or different and are selected from the group consisting of

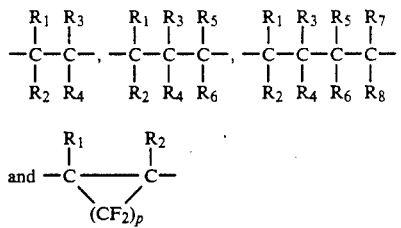

wherein p is an integer between 1 and 50; wherein $R_1$, $R_2$, $R_3$, $R_4$, $R_5$, $R_6$, $R_7$ and $R_8$, either separately or together are F, Cl, a perfluoroalkyl of one to 20 carbons or a perfluoroalkyl ether of two to 20 carbons wherein one or more fluorine atoms may be substituted by a halogen atom other than fluorine; wherein $R_2$ and $R_8$ when, taken together, can be $-CR_9R_{10}CR_{11}R_{12}-$, wherein $R_9$ through $R_{12}$ are the same or different and are selected from the groups given for $R_1$ to $R_8$; wherein X and Z are the same or different and are selected from the group consisting of $-(CF_2)_rOCF_3$, wherein r is an integer from 1 to 12, perfluoroalkyl of 1 to 10 carbon atoms, perfluoroalkyleneoxyalkyl and perfluoropoly(alkyleneoxyalkyl); wherein one or more of the fluorine atoms may be substituted by a halogen atom other than fluorine; wherein m is an integer from 0 to 50; n is an integer from 1 to 50; and wherein the chlorofluoropolyether has at least two chlorine atoms.

26. The composition of claim 25 wherein the chlorofluoropolyether lubricant is perfluoropolyepichlorohydrin having a molecular weight of from about 500 to about 5000 a.m.u.

27. The composition of claim 1 wherein the chlorofluoropolyether has an average formula:

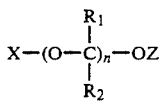

wherein X and Z are the same or different and are selected from the group consisting of $-(CF_2)_rOCF_3$ and $-C_rF_{2r+1-q}Cl_q$, wherein r is an integer from 1 to 12 and q is an integer from 0 to 25; wherein $R_1$ and $R_2$ are the same or different and are selected from the group consisting of $-F$, $-Cl$, $-CF_2Cl$, $-CFCl_2$, $-CCl_3$, perfluoroalkyl of one to ten carbon atoms and perfluoroalkoxyalkyl of one to ten carbon atoms wherein one or more of the fluorine atoms may be substituted by a halogen atom other than fluorine; and wherein the chlorofluoropolyether has at least two chlorine atoms and n is an integer from 1 to 50.

* * * * *

UNITED STATES PATENT AND TRADEMARK OFFICE
CERTIFICATE OF CORRECTION

PATENT NO. : 5,198,139
DATED : March 30, 1993
INVENTOR(S) : Bierschenk, et. al.

It is certified that error appears in the above-indentified patent and that said Letters Patent is hereby corrected as shown below:

On the Title page, item [54] and col. 1, line 1, delete "chlorofluoroploymers" and insert --chlorofluoropolyethers--.

Column 11, Claim 21, line 3, before -OZ delete "n" and insert --m--.

Signed and Sealed this

Twenty-first Day of December, 1993

Attest:

BRUCE LEHMAN

*Attesting Officer*    Commissioner of Patents and Trademarks